(12) United States Patent
Zhu et al.

(10) Patent No.: US 9,160,133 B2
(45) Date of Patent: Oct. 13, 2015

(54) LASER

(71) Applicants: Tsinghua University, Beijing (CN); HON HAI PRECISION INDUSTRY CO., LTD., New Taipei (TW)

(72) Inventors: Jun Zhu, Beijing (CN); Jing-Lei Zhu, Beijing (CN); Qun-Qing Li, Beijing (CN); Kai-Li Jiang, Beijing (CN); Chen Feng, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/137,219

(22) Filed: Dec. 20, 2013

(65) Prior Publication Data
US 2014/0177665 A1   Jun. 26, 2014

(30) Foreign Application Priority Data
Dec. 26, 2012 (CN) .......................... 2012 1 0573097

(51) Int. Cl.
*H01S 3/08* (2006.01)
*H01S 3/223* (2006.01)

(52) U.S. Cl.
CPC ........... *H01S 3/08068* (2013.01); *H01S 3/2232* (2013.01)

(58) Field of Classification Search
CPC ... H01S 3/0092; H01S 5/0282; H01S 5/0287; H01S 5/18361; H01S 3/0941; H01S 3/09415; H01S 3/10; H01S 3/109; H01S 5/005; H01S 5/026; H01S 5/12; H01S 5/14; H01S 5/183; H01S 5/18355; H01S 5/18358; H01S 5/32
USPC .................................................. 372/55, 61, 99
See application file for complete search history.

(56) References Cited

U.S. PATENT DOCUMENTS

| | | | | |
|---|---|---|---|---|
| 5,029,173 A * | 7/1991 | Seguin | ............................ | 372/23 |
| 5,058,123 A * | 10/1991 | Yasui et al. | ..................... | 372/99 |
| 5,210,768 A * | 5/1993 | Seguin | ............................ | 372/92 |
| 5,506,858 A * | 4/1996 | Takenaka et al. | ............... | 372/92 |
| 6,263,007 B1 * | 7/2001 | Tang | ............................... | 372/59 |
| 7,483,466 B2 * | 1/2009 | Uchida et al. | ............. | 372/50.11 |

* cited by examiner

*Primary Examiner* — Xinning Niu
*Assistant Examiner* — Vu A Vu
(74) *Attorney, Agent, or Firm* — Novak Druce Connolly Bove + Quigg LLP (57) ABSTRACT

A laser includes a total reflective mirror, an output mirror, a discharge lamp, and an active laser medium. The total reflective mirror, the output mirror, and the discharge lamp define a resonant cavity. The active laser medium is filled in the resonant cavity. The total reflective mirror includes a body, a metal film, and at least one microstructure. The at least one microstructure is concaved from a first reflective surface of the total reflective mirror. The at least one microstructure has a depth and a lateral size, and both the depth and the lateral size are in a range from about 0.5λ to about 2λ, while λ is a working wavelength of the laser.

18 Claims, 12 Drawing Sheets

FIG. 12 ium 108 is carbon dioxide ($CO_2$),
LASER

CROSS-REFERENCE TO RELATED APPLICATIONS

This application claims all benefits accruing under 35 U.S.C. §119 from China Patent Application No. 201210573097.6, filed on Dec. 26, 2012 in the China Intellectual Property Office. This application is also related to application entitled, "LASER", filed Dec. 20, 2013 Ser. No. 14/137,248, "LASER", filed Dec. 20, 2013 Ser. No. 14/137,236, "LASER", filed Dec. 20, 2013 Ser. No. 14/137,197, and "LASER", filed Dec. 20, 2013 Ser. No. 14/137,185. Disclosures of the above-identified applications are incorporated herein by reference.

BACKGROUND

1. Technical Field

The present disclosure relates to lasers.

2. Description of Related Art

Because of the high power levels available, a variety of lasers are frequently used in industrial applications such as cutting and welding, and in military applications such as laser weapons.

Most of the high power lasers are multi-mode lasers, and the laser beams have large divergence angle, shallow depth of focus, low stability, and high power density loss during long distance transmission.

What is needed, therefore, is to provide a laser in which the laser beam has small divergence angle, long depth of focus, small spot size, and low power density loss during long distance transmission.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
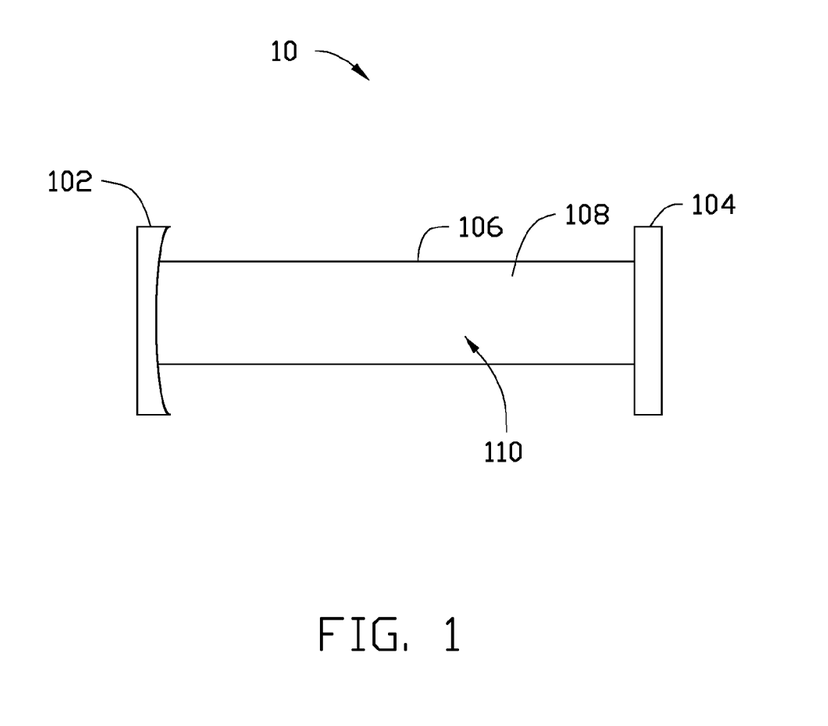
FIG. 1 is a schematic diagram of a laser according to one embodiment.

FIG. 1 is one embodiment of a laser 10. The laser 10 includes a total reflective mirror 102, an output mirror 104, a discharge lamp 106, and an active laser medium 108. The total reflective mirror 102 and the output mirror 104 are separately configured on two opposite ends of the discharge lamp 106. The total reflective mirror 102, the output mirror 104, and the discharge lamp 106 define a resonant cavity 110. The active laser medium 108 is filled in the resonant cavity 110.

Similar to some prior art, the laser 10 further includes two electrodes, a water-cooled jacket, a water inlet, a water outlet, a gas reservoir, a gas tube, and other regular components (not shown in FIG. 1).

Figure 2:
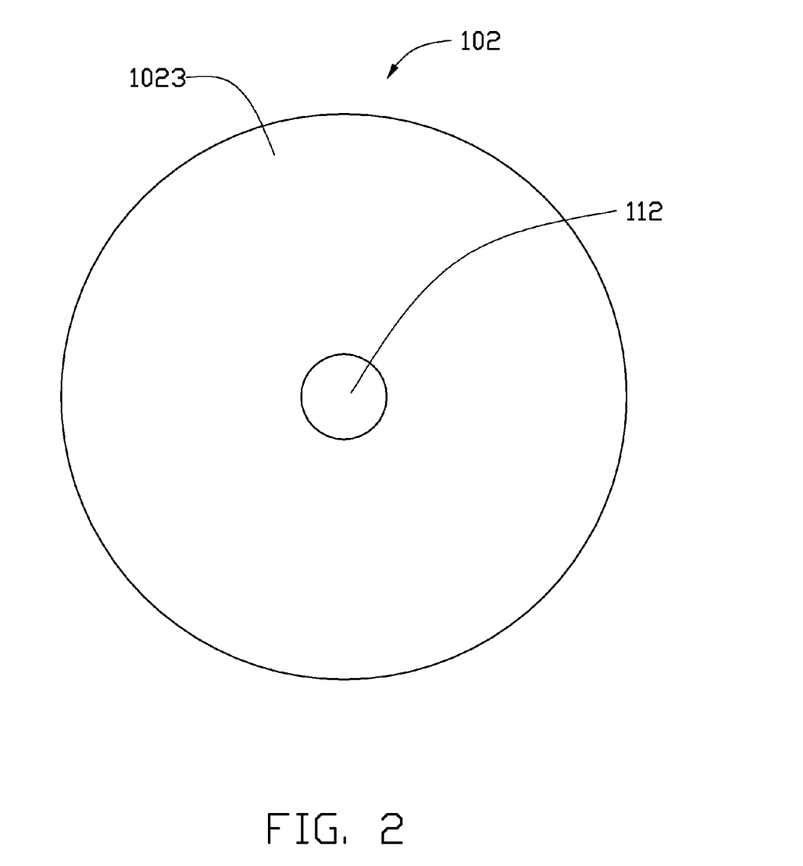
FIG. 2 is a top view of a total reflective mirror in the laser of FIG. 1.
Figure 3:
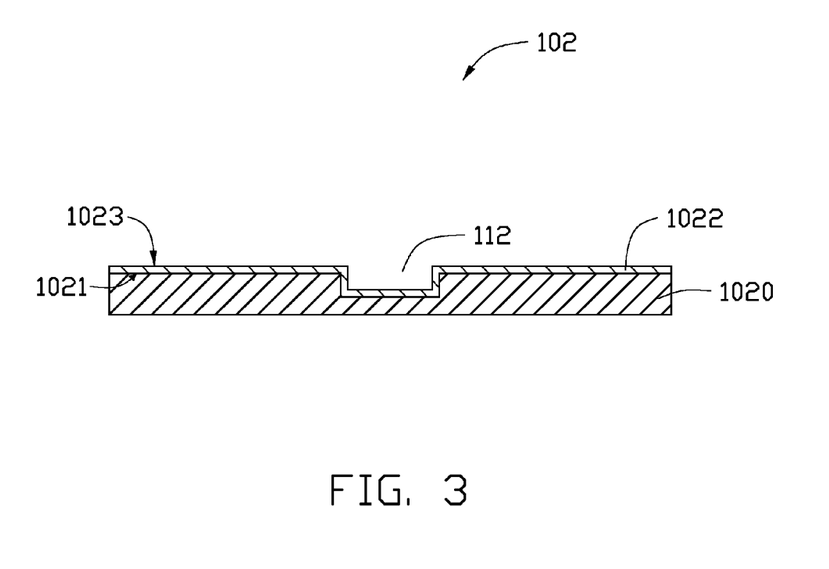
FIG. 3 is a cross-sectional view of the total reflective mirror in the laser of FIG. 1.

FIG. 2 and FIG. 3 show that the total reflective mirror 102 is a spherical mirror having a curvature radius ranging from about 0.5 meters to about 5 meters. In one embodiment, the curvature radius of the total reflective mirror 102 is 1.5 meters.

The total reflective mirror 102 includes a body 1020 defining a first reflective surface 1021, and a metal film 1022 coated on the first reflective surface 1021 of the body 1020. The metal film 1022 has a second reflective surface 1023, which faces the output mirror 104. The total reflective mirror 102 further includes a microstructure 112.

The body 1020 is made of a nonmetal which is not easy to deform under heating, such as silicon, silicon oxide, and silicon carbide. In one embodiment, the body 1020 is made of silicon. The body 1020 has a diameter ranging from about 5 millimeters to about 50 millimeters. In one embodiment, the body 1020 has a diameter of 20 millimeters. The body 1020 has a thickness ranging from about 2 millimeters to about 20 millimeters. In one embodiment, the body 1020 has a thickness of 5 millimeters.

The metal film 1022 is made of a metal which has high melting point, it is difficult to be oxidized, and can produce surface plasma. In one embodiment, gold is used to make the metal film 1022. The metal film 1022 has a thickness which is greater than its skin depth. In one embodiment, the thickness of the metal film 1022 is greater than 50 nanometers. The metal film 1022 can be coated onto the first reflective surface 1021 of the body 1020 by electroplating, depositing, sputtering, spraying, or any other coating methods.

The microstructure 112 is concaved from the first reflective surface 1021 of the body 1020. The metal film 1022 coats both on the first reflective surface 1021 and the microstructure 112. The microstructure 112 is located close to a center of the first reflective surface 1021. In one embodiment, the microstructure 112 is located on the center of the first reflective surface 1021. The microstructure 112 can be formed by etching the body 1020 with the aid of a mask.

The microstructure 112 is a hole with a geometric shape. The shape of the hole can be round, oval, square, rectangular, hexagonal, or octagonal, for example. In one embodiment, the microstructure 112 is a round hole.

The microstructure 112 has a depth relating to a working wavelength of the laser 10. The depth is in a range from about $0.5\lambda$ to about $2\lambda$, wherein $\lambda$ is the working wavelength of the laser 10. In one embodiment, the depth of the microstructure 112 is $0.5\lambda$. In another embodiment, the depth of the microstructure 112 is $\lambda$. The working wavelength of the laser 10 is determined by the active laser medium 108. In one embodiment, the active laser medium 108 is carbon dioxide ($CO_2$), and the working wavelength $\lambda$ is 10.6 micrometers. The depth of the microstructure 112 is in a range from about 5.3 micrometers to about 21.2 micrometers. In one embodiment, the depth of the microstructure 112 is 5.3 micrometers.

The microstructure 112 has a lateral size relating to a working wavelength $\lambda$ of the laser 10 too. The lateral size is in a range from about $0.5\lambda$ to about $2\lambda$. In one embodiment, the lateral size of the microstructure 112 is $0.5\lambda$. In another embodiment, the lateral size of the microstructure 112 is $\lambda$. The working wavelength $\lambda$ of the laser 10 is determined by the active laser medium 108. In one embodiment, the active laser medium 108 is carbon dioxide ($CO_2$), and the working wavelength $\lambda$ is 10.6 micrometers. The lateral size of the microstructure 112 is in a range from about 5.3 micrometers to about 21.2 micrometers. In one embodiment, the lateral size of the microstructure 112 is 5.3 micrometers. When the microstructure 112 is a round hole, then the lateral size of the microstructure 112 is a diameter of the hole. When the microstructure 112 is a square hole or other polygonal hole, then the lateral size of the microstructure 112 is a maximum distance of diagonals of the hole.

While the depth and the lateral size of the microstructure 112 are both in a range from about $0.5\lambda$ to about $2\lambda$, then the laser beam obtained by the laser 10 will have a relatively small divergence angle and spot size.

The output mirror 104 is a flat mirror. A diameter can be same as the body 1020 of the total reflective mirror 102. In one embodiment, the diameter of the output mirror 104 is 20 millimeters. The output mirror 104 is a partial reflective mirror. A reflectivity of the output mirror 104 ranges from about 25% to about 55%. The output mirror 104 is made of germanium, zinc selenide, or gallium arsenide. In one embodiment, the output mirror 104 is made of zinc selenide.

The discharge lamp 106 is a quartz glass tube. The discharge lamp 106 has a diameter smaller than that of the output mirror 104. In one embodiment, the diameter of the discharge lamp 106 is in a range from about 2 millimeters to about 10 millimeters. In another embodiment, the diameter of the discharge lamp 106 is in a range from about 5 millimeters to about 6 millimeters.

The active laser medium 108 can be gas, such as $CO_2$, helium (He), neon (Ne), nitrogen ($N_2$), and carbon oxide (CO). The active laser medium 108 can also be solid, liquid, or semi-conductor. In one embodiment, the active laser medium 108 is $CO_2$.

The resonant cavity 110 has a length of about 400 millimeters to about 800 millimeters. In one embodiment, the length of the resonant cavity 110 ranges from about 500 millimeters to about 600 millimeters. In another embodiment, the length of the resonant cavity 110 is 600 millimeters.

Figure 4:
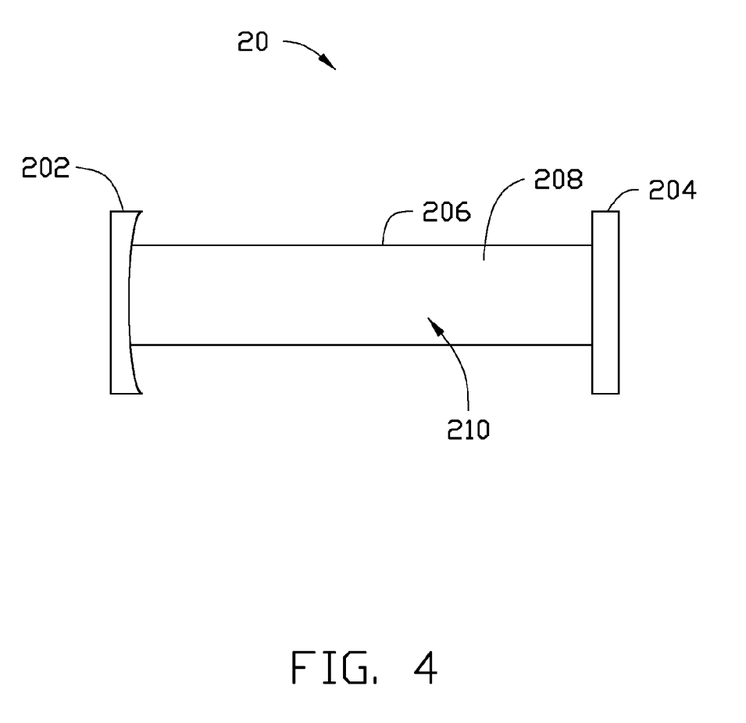
FIG. 4 is a schematic diagram of a laser according to another embodiment.

FIG. 4 shows that in another embodiment, a laser 20 includes a total reflective mirror 202, an output mirror 204, a discharge lamp 206, and an active laser medium 208. The total reflective mirror 202 and the output mirror 204 are separately configured on two opposite ends of the discharge lamp 206. The total reflective mirror 202, the output mirror 204, and the discharge lamp 206 define a resonant cavity 210. The active laser medium 208 is filled in the resonant cavity 210.

Figure 5:
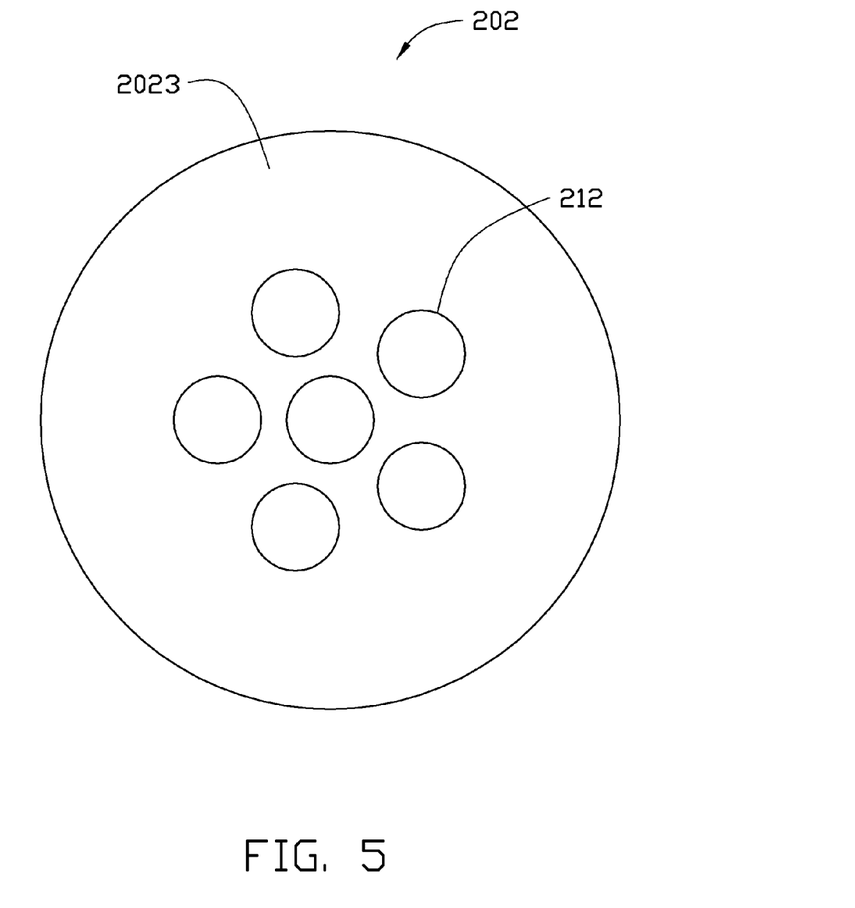
FIG. 5 is a top view of a total reflective mirror in the laser of FIG. 4.
Figure 6:
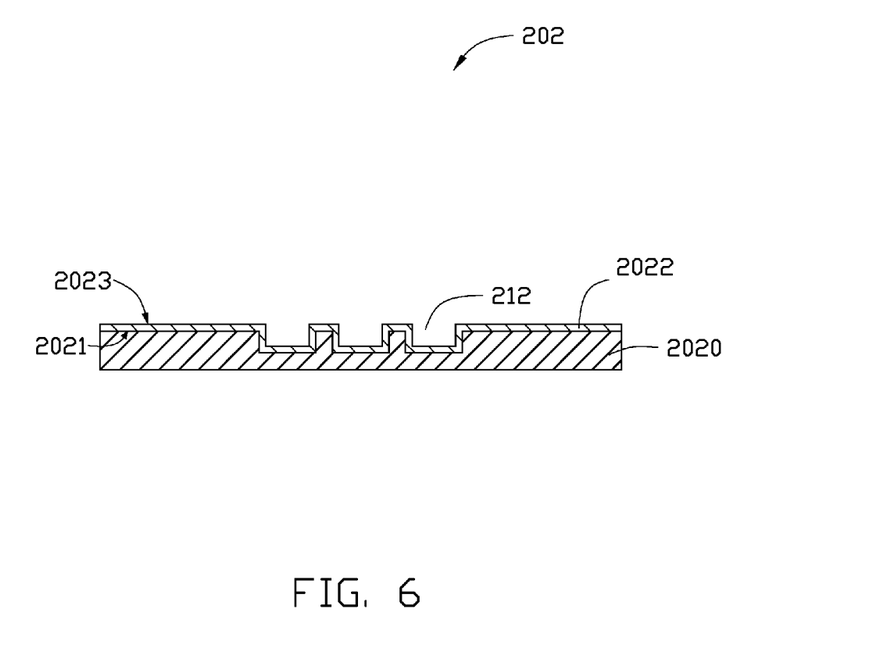
FIG. 6 is a cross-sectional view of the total reflective mirror in the laser of FIG. 4.

FIG. 5 and FIG. 6 show that the total reflective mirror 202 includes a body 2020 defining a first reflective surface 2021, and a metal film 2022 coated on the first reflective surface 2021 of the body 2020. The metal film 2022 has a second reflective surface 2023, which faces the output mirror 204. Different to the laser 10, the total reflective mirror 202 further includes a plurality of microstructures 212. In one embodiment, the plurality of microstructures 212 forms an array.

The plurality of microstructures 212 is concaved from the first reflective surface 2021 of the body 2020. The metal film 2022 coats both on the first reflective surface 2021 and the plurality of microstructures 212. The plurality of microstructures 212 is located close to a center of the first reflective surface 2021. In one embodiment, one of the microstructures 212 is located on the center of the first reflective surface 2021, while the microstructures 212 are symmetrically distributed around the first one. The plurality of microstructures 212 can be formed by etching the body 2020 with the aid of a mask.

Each of the plurality of microstructures 212 is a hole with a geometric shape. The shape of the hole can be round, oval, square, rectangular, hexagonal, or octagonal, for example. In one embodiment, each of the plurality of microstructures 212 is a round hole.

Similar to the laser 10, each of the plurality of microstructures 212 in the laser 20 has a depth ranging from about 0.5, to about $2\lambda$, wherein $\lambda$ is the working wavelength of the laser 20. The plurality of microstructures 212 can have a same depth. In one embodiment, the same depth is $0.5\lambda$. In another embodiment, the same depth is $\lambda$. The plurality of microstructures 212 can also have different depths. When the active laser medium 208 is $CO_2$, each of the plurality of microstructures 212 has a depth ranging from about 5.3 micrometers to about 21.2 micrometers.

Similar to the laser 10, each of the plurality of microstructures 212 in the laser 20 has a lateral size ranging from about $0.5\lambda$ to about $2\lambda$ too. The plurality of microstructures 212 can have a same lateral size. In one embodiment, the same lateral size is $0.5\lambda$. In another embodiment, the same lateral size is $\lambda$. The plurality of microstructures 212 can also have different lateral sizes. When the active laser medium 208 is $CO_2$, each of the plurality of microstructures 212 has a lateral size ranging from about 5.3 micrometers to about 21.2 micrometers.

There is an interval between each two adjacent microstructures 212. Each interval has a size ranging from about $0.5\lambda$ to about $2\lambda$. In one embodiment, all the intervals have a same size. In another embodiment, the same size of all the intervals is $\lambda$. In yet another embodiment, the same size of all the intervals is $1.5\lambda$. When the active laser medium 208 is $CO_2$, each interval has a size ranging from about 5.3 micrometers to about 21.2 micrometers.

The other components of the laser 20 are all the same as that of the laser 10.

Compared with the laser 10 having one microstructure 112, the laser 20 has a plurality of microstructures 212; additionally, each interval between each two adjacent microstructures 212 has a size ranging from about $0.5\lambda$ to about $2\lambda$, therefore, the surface plasma resonance produced in the resonant cavity 210 is more remarkable. A laser beam which has a long depth of focus, and low power density loss during long distance transmission can then be obtained.

Figure 7:
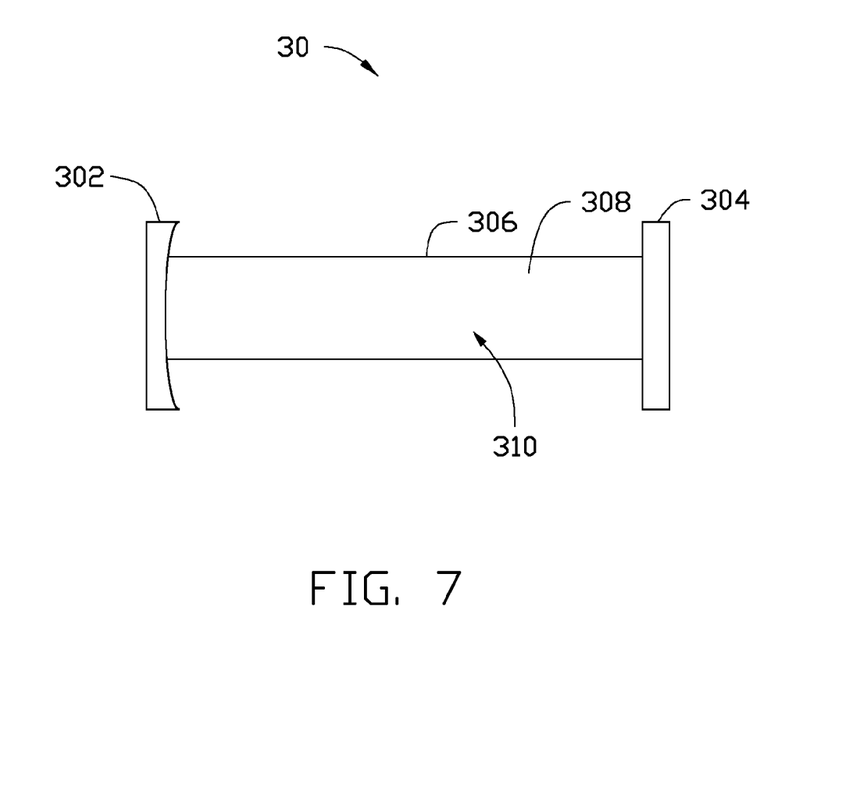
FIG. 7 is a schematic diagram of a laser according to another embodiment.

FIG. 7 shows that in one embodiment, a laser 30 includes a total reflective mirror 302, an output mirror 304, a discharge lamp 306, and an active laser medium 308. The total reflective mirror 302 and the output mirror 304 are separately configured on two opposite ends of the discharge lamp 306. The total reflective mirror 302, the output mirror 304, and the discharge lamp 306 define a resonant cavity 310. The active laser medium 308 is filled in the resonant cavity 310.

Figure 8:
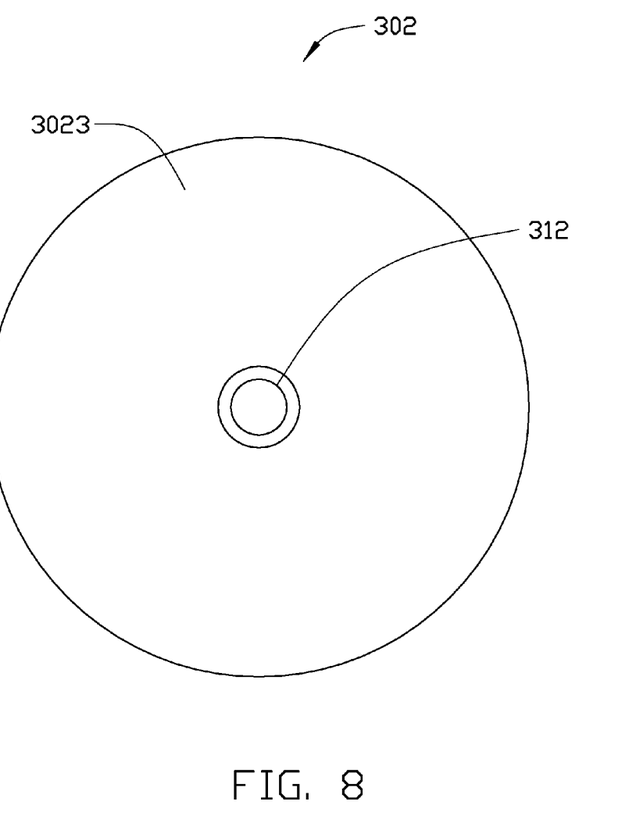
FIG. 8 is a schematic diagram of a total reflective mirror in the laser of FIG. 7.
Figure 9:
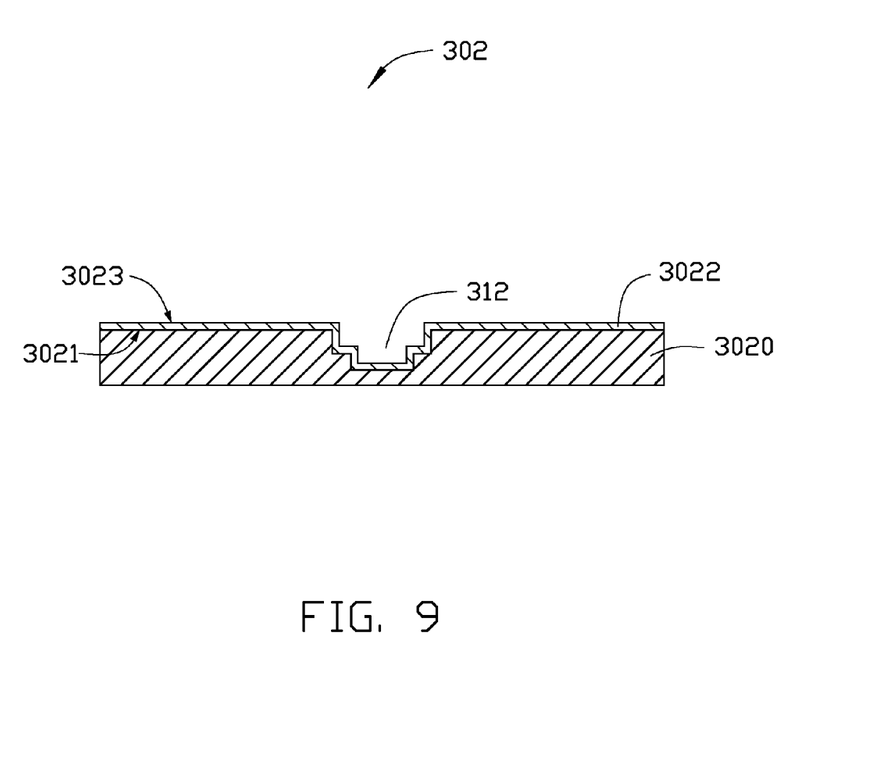
FIG. 9 is a cross-sectional view of the total reflective mirror in the laser of FIG. 7.

FIG. 8 and FIG. 9 show that the total reflective mirror 302 includes a body 3020 defining a first reflective surface 3021, and a metal film 3022 coated on the first reflective surface 3021 of the body 3020. The metal film 3022 has a second reflective surface 3023, which faces the output mirror 304. The total reflective mirror 302 further includes a microstructure 312.

The microstructure 312 is concaved from the first reflective surface 3021 of the body 3020. The metal film 3022 coats both on the first reflective surface 3021 and the microstructure 312. The microstructure 312 is located close to a center of the first reflective surface 3021. In one embodiment, the microstructure 312 is located on the center of the first reflective surface 3021. The microstructure 312 can be formed by etching the body 3020 with the aid of masks.

Different from the microstructures 112 and 212, the microstructure 312 is a step structure. The step structure includes a plurality of holes stacked with each other in series with respect to their lateral size. The larger the lateral size is, the closer to the first reflective surface 3021 the hole is located. In one embodiment, the microstructure 312 includes two holes stacked together.

The shape of the plurality of holes can be round, oval, square, rectangular, hexagonal, or octagonal, for example. In one embodiment, the plurality of holes in the microstructure 312 is round hole.

The depth of the microstructure 312 is a sum of the depth of the plurality of holes. Similar to the laser 10 and 20, each of the plurality of holes in the microstructure 312 has a depth ranging from about $0.5\lambda$ to about $2\lambda$, wherein $\lambda$ is the working wavelength of the laser 30. The plurality of holes can have a same depth. In one embodiment, the same depth is $0.5\lambda$. In another embodiment, the same depth is $\lambda$. The plurality of holes can also have different depths. The depth of the microstructure 312 can range from about $\lambda$ to about $6\lambda$. In one embodiment, the depth of the microstructure 312 is $\lambda$. In another embodiment, the depth of the microstructure 312 is $2\lambda$.

While the microstructure 312 includes two holes stacked together, and both the two holes have a depth of $0.5\lambda$, then the laser beam obtained by the laser 30 will have a relatively small divergence angle and spot size.

The microstructure 312 is a step structure, so it has different lateral size in each step. Each step corresponds to each hole in the microstructure 312. Therefore, the lateral size of each step is the lateral size of each corresponding hole. Similar to the laser 10 and 20, each hole in the microstructure 312 has a lateral size ranging from about $0.5\lambda$ to about $2\lambda$. While each hole in the microstructure 312 has a lateral size ranging from about $0.5\lambda$ to about $2\lambda$, a laser beam obtained by the laser 30 can have a relatively small spot size, and a relatively low power density loss during long distance transmission. In one embodiment, the microstructure 312 includes two holes stacked together, wherein one hole has a lateral size of $0.5\lambda$, and another one has a lateral size of $\lambda$. In another embodiment, the microstructure 312 includes three holes stacked together, wherein the first hole has a lateral size of $0.5\lambda$, the second one has a lateral size of $\lambda$, and the third one has a lateral size of $1.5\lambda$.

The other components of the laser 30 are all the same as that of the laser 10.

Figure 10:
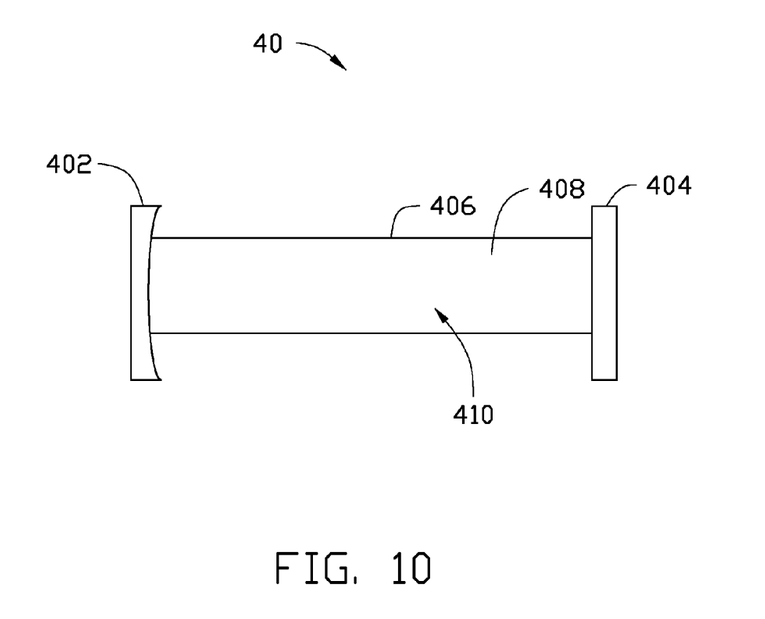
FIG. 10 is a schematic diagram of a laser according to another embodiment.

FIG. 10 shows that in one embodiment, a laser 40 includes a total reflective mirror 402, an output mirror 404, a discharge lamp 406, and an active laser medium 408. The total reflective mirror 402 and the output mirror 404 are separately configured on two opposite ends of the discharge lamp 406. The total reflective mirror 402, the output mirror 404, and the discharge lamp 406 define a resonant cavity 410. The active laser medium 408 is filled in the resonant cavity 310.

Figure 11:
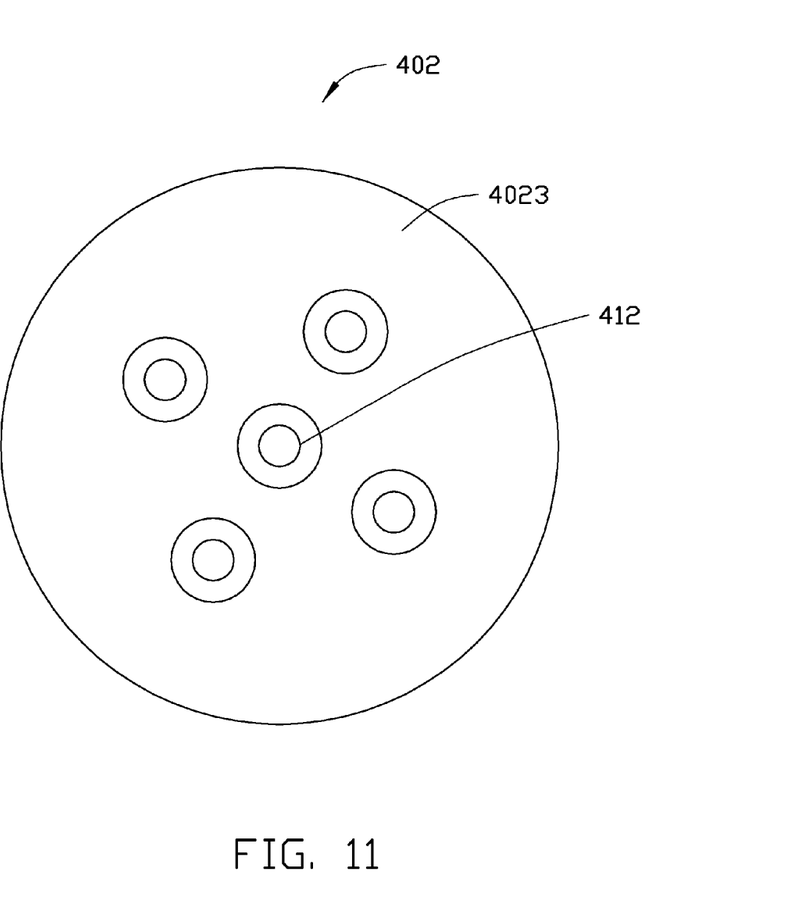
FIG. 11 is a top view of a total reflective mirror in the laser of FIG. 10.
Figure 12:
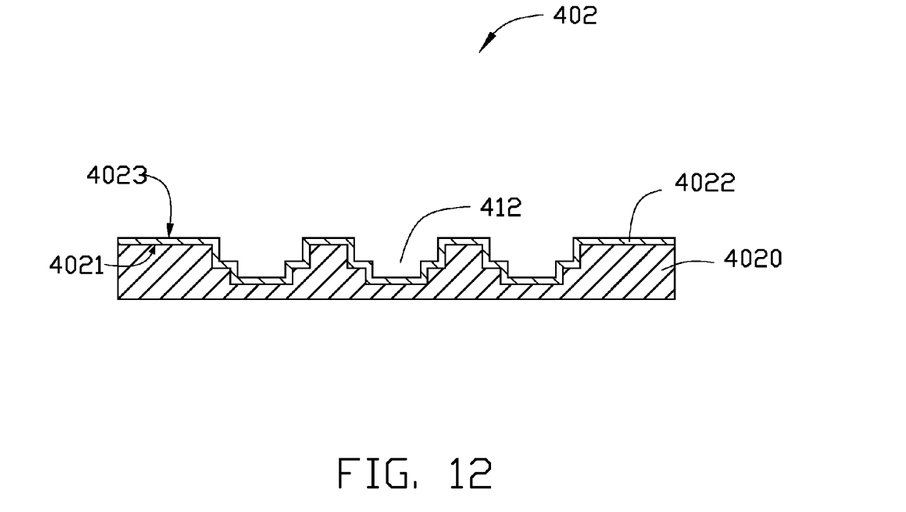
FIG. 12 is a cross-sectional view of the total reflective mirror in the laser of FIG. 10.

FIG. 11 and FIG. 12 show that the total reflective mirror 402 includes a body 4020 defining a first reflective surface 4021, and a metal film 4022 coated on the first reflective surface 4021 of the body 4020. The metal film 4022 has a second reflective surface 4023, which faces the output mirror 404. The total reflective mirror 402 further includes a plurality of microstructures 412.

The plurality of microstructures 412 is concaved from the first reflective surface 4021 of the body 4020. The metal film 4022 coats both on the first reflective surface 4021 and the plurality of microstructures 412. The plurality of microstructures 412 is located close to a center of the first reflective surface 4021. In one embodiment, one of the microstructures 412 is located on the center of the first reflective surface 4021, while the microstructures 412 are symmetrically distributed around the first one. The plurality of microstructures 412 can be formed by etching the body 4020 with the aid of masks.

The shape, structure, and size of the microstructure 412 are all the same as that of the microstructure 312.

There is an interval between each two adjacent microstructures 412. Each interval has a size ranging from about $0.5\lambda$ to about $2\lambda$. In one embodiment, all the intervals have a same size. In another embodiment, the same size of all the intervals is $\lambda$. In yet another embodiment, the same size of all the intervals is $1.5\lambda$. When the active laser medium 208 is $CO_2$, each interval has a size ranging from about 5.3 micrometers to about 21.2 micrometers.

The other components of the laser 40 are all the same as that of the laser 30.

Compared with the laser 30 having one microstructure 312, the laser 40 has a plurality of microstructures 412; additionally, each interval between each two adjacent microstructures 412 has a size ranging from about $0.5\lambda$ to about $2\lambda$, therefore, the surface plasma resonance produced in the resonant cavity 410 is more remarkable. A laser beam which has a long depth of focus, and low power density loss during long distance transmission can then be obtained.

The laser beam obtained by the laser 10, 20, 30 and 40 in present disclosure has a high quality beam, a long depth of focus, and a high power density in the beam center. Therefore, the laser beam can be easily applied in cutting or welding, especially in long distance transmission or commutation.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A laser comprising:
  a total reflective mirror comprising a body defining a first reflective surface, a metal film entirely coated on the first reflective surface, and at least one microstructure, wherein the at least one microstructure is concaved from the first reflective surface, the at least one microstructure comprises a blind hole located at the center of the total reflective mirror, and the at least one microstructure is coated by the metal film;
  an output mirror;
  a discharge lamp, wherein the total reflective mirror and the output mirror are located on two opposite ends of the discharge lamp; and
  an active laser medium;
  wherein the total reflective mirror, the output mirror, and the discharge lamp define a resonant cavity, and the active laser medium is filled in the resonant cavity.

2. The laser as claimed in claim 1, wherein a shape of the hole is selected from the group consisting of round, oval, square, rectangular, hexagonal, and octagonal.

3. The laser as claimed in claim 1, wherein the laser has a working wavelength $\lambda$, and each of the at least one microstructure has a depth ranging from about $0.5\lambda$ to about $2\lambda$.

4. The laser as claimed in claim 3, wherein each of the at least one microstructure has a lateral size ranging from about $0.5\lambda$ to about $2\lambda$.

5. The laser as claimed in claim 1, wherein the total reflective mirror comprises a plurality of microstructures.

6. The laser as claimed in claim 5, wherein the laser has a working wavelength $\lambda$, and each of the plurality of microstructures has a depth ranging from about $0.5\lambda$ to about $2\lambda$.

7. The laser as claimed in claim 6, wherein the plurality of microstructures has a same depth of $\lambda$.

8. The laser as claimed in claim 5, wherein each of the plurality of microstructures has a lateral size ranging from about $0.5\lambda$ to about $2\lambda$.

9. The laser as claimed in claim 8, wherein the plurality of microstructures has a same lateral size of $\lambda$.

10. The laser as claimed in claim 5, wherein an interval is defined between each two microstructures, and each interval has a size ranging from about $0.5\lambda$ to about $2\lambda$.

11. The laser as claimed in claim 10, wherein each interval has a same size of $\lambda$.

12. A laser comprising:
a total reflective mirror comprising a body defining a first reflective surface, a metal film entirely coated on the first reflective surface, and a plurality of microstructures, wherein the plurality of microstructures are blind holes concaved from the first reflective surface, one of the plurality of microstructures is located on the center of the first reflective surface, rest of the plurality of microstructures are symmetrically distributed around the one of the plurality of microstructures, and the at least one microstructure is coated by the metal film;
an output mirror;
a discharge lamp, wherein the total reflective mirror and the output mirror are located on two opposite ends of the discharge lamp; and
an active laser medium;
wherein the total reflective mirror, the output mirror, and the discharge lamp define a resonant cavity, and the active laser medium is filled in the resonant cavity.

13. The laser as claimed in claim 12, wherein the laser has a working wavelength $\lambda$, and each of the plurality of holes has a depth ranging from about $0.5\lambda$ to about $2\lambda$.

14. The laser as claimed in claim 13, wherein each of the at least one microstructure has a depth ranging from about $\lambda$ to about $6\lambda$.

15. The laser as claimed in claim 12, wherein each of the plurality of holes has a lateral size ranging from about $0.5\lambda$ to about $2\lambda$.

16. The laser as claimed in claim 12, wherein the plurality of microstructures has a same shape and a same size.

17. The laser as claimed in claim 16, wherein there is an interval between each two adjacent microstructures, and each interval has a size ranging from about $0.5\lambda$ to about $2\lambda$.

18. The laser as claimed in claim 17, wherein each interval has a same size of $\lambda$.

* * * * *